US009545952B2

United States Patent
Sakaguchi et al.

(10) Patent No.: US 9,545,952 B2
(45) Date of Patent: Jan. 17, 2017

(54) VEHICLE LOWER PART STRUCTURE

(71) Applicant: TOYOTA JIDOSHA KABUSHIKI KAISHA, Toyota-shi, Aichi-ken (JP)

(72) Inventors: Naoya Sakaguchi, Okazaki (JP); Masahiro Ishikawa, Toyota (JP); Keita Ito, Nissin (JP); Yutaka Yamada, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/891,185

(22) PCT Filed: May 19, 2014

(86) PCT No.: PCT/IB2014/000752
§ 371 (c)(1),
(2) Date: Nov. 13, 2015

(87) PCT Pub. No.: WO2014/188247
PCT Pub. Date: Nov. 27, 2014

(65) Prior Publication Data
US 2016/0083017 A1 Mar. 24, 2016

(30) Foreign Application Priority Data
May 23, 2013 (JP) .................................. 2013-109031

(51) Int. Cl.
*B62D 21/15* (2006.01)
*B62D 25/20* (2006.01)

(52) U.S. Cl.
CPC ............. *B62D 21/157* (2013.01); *B62D 25/20* (2013.01); *B62D 25/2036* (2013.01)

(58) Field of Classification Search
CPC .... B62D 21/15; B62D 25/025; B62D 25/2036
USPC ............................................ 296/187.12, 209
See application file for complete search history.

(56) References Cited

U.S. PATENT DOCUMENTS

| 2005/0093343 A1* | 5/2005 | Tokumoto | B60R 13/04 296/209 |
| 2013/0270864 A1* | 10/2013 | Young | B60K 1/04 296/187.12 |
| 2015/0174996 A1* | 6/2015 | Ikeda | B60K 1/04 180/68.5 |

(Continued)

FOREIGN PATENT DOCUMENTS

| JP | H07-277228 A | 10/1995 |
| JP | H10-16822 A | 1/1998 |
| JP | 2014-031109 A | 2/2014 |

*Primary Examiner* — Jason S Morrow
(74) *Attorney, Agent, or Firm* — Oliff PLC

(57) ABSTRACT

An outer energy absorbing member and an inner energy absorbing member are mounted on a lower surface side of a vehicle bottom part. The outer energy absorbing member and the inner energy absorbing member are arranged adjacent and in parallel to each other in a vehicle width direction. A recessed engagement part is formed in a side end part of the outer energy absorbing member on an inner side in the vehicle width direction, and a projecting engagement part is formed in a side end part of the inner energy absorbing member on an outer side in the vehicle width direction. The recessed engagement part and the projecting engagement part are engaged with each other at a time of side impact.

7 Claims, 4 Drawing Sheets

(56) References Cited

U.S. PATENT DOCUMENTS

| | | | |
|---|---|---|---|
| 2015/0176673 A1* | 6/2015 | Kaneko | B62D 21/157 188/377 |
| 2016/0059897 A1* | 3/2016 | Lang | B62D 29/001 296/209 |
| 2016/0068196 A1* | 3/2016 | Saeki | B62D 25/2072 296/187.08 |
| 2016/0114667 A1* | 4/2016 | Ikeda | B60K 1/04 180/68.5 |

* cited by examiner

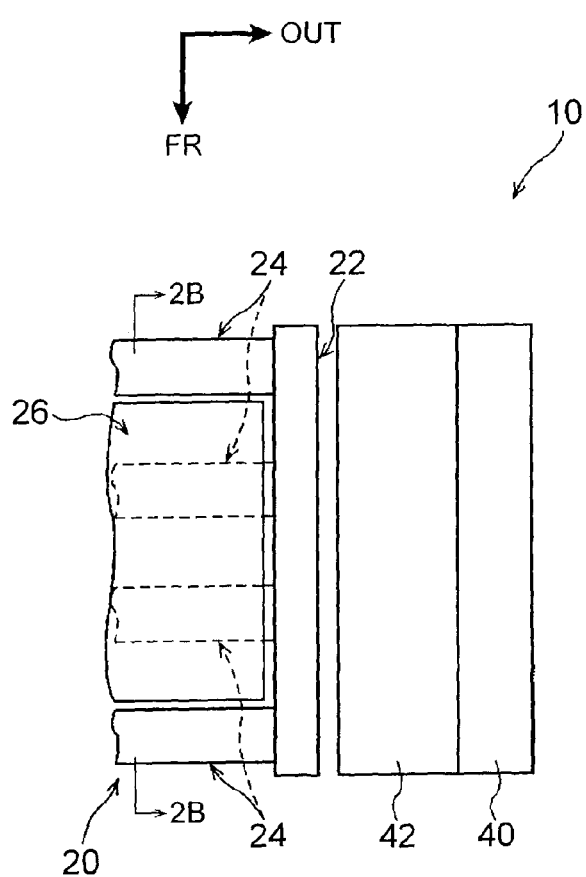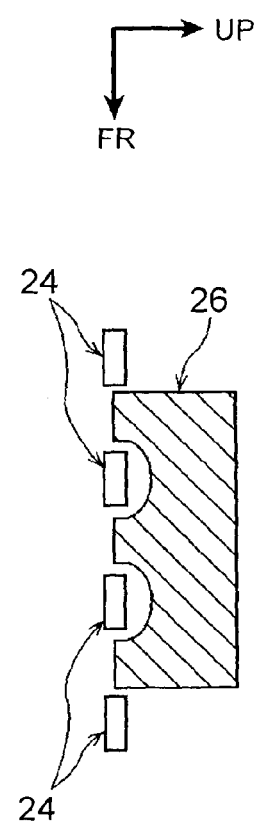

VEHICLE LOWER PART STRUCTURE

BACKGROUND OF THE INVENTION

1. Field of the Invention

The invention relates to a vehicle lower part structure.

2. Description of Related Art

As a vehicle lower part structure, there is a structure in which an energy absorbing member is arranged on a lower side of a rocker in order to absorb impact energy at a time of side impact. For example, Japanese Patent Application Publication No. 10-16822 (JP 10-16822 A) discloses a structure in which an energy absorbing member is arranged between a frame and a side step. Also, an example of a structure is disclosed as a modified example, in which a high-rigidity member is arranged between a frame and a side step so that the side step is able to absorb energy.

In a case where, for example, a side step and an energy absorbing member are integrated in order to improve load transmission performance at a time of side impact, it is necessary to fix the integrated object to a vehicle bottom part at a plurality of locations in a vehicle width direction. This makes it difficult to align positions of fixing regions. Meanwhile, in a case where, for example, an energy absorbing member is arranged between a frame and a side step, and the side step is structured to be able to absorb energy in order to ensure mountability on a vehicle bottom part and improve energy absorbing performance further, an impact load is not transmitted sufficiently to the energy absorbing member if the side step is inclined at a time of side impact. Therefore, there is a room for improvement in terms of enhancement of energy absorbing performance at a time of side impact.

SUMMARY OF THE INVENTION

The invention obtains a vehicle lower part structure that is able to enhance energy absorbing performance at a time of side impact while ensuring mountability on a vehicle bottom part.

An aspect of a vehicle lower part structure according to the invention includes a vehicle bottom part configured to include a lower part of a rocker provided in a lower end part of a vehicle side part, a plurality of energy absorbing members configured to be mounted on a lower surface side of the vehicle bottom part and arranged adjacent to each other in a vehicle width direction, at least one of the energy absorbing members being arranged on the lower side of the rocker, and engagement part configured to be recessed and projecting and be provided in opposing parts of the energy absorbing members adjacent to each other, respectively, and allow the opposing parts of the energy absorbing members adjacent to each other to be engaged with each other in a case where a load is inputted to the plurality of energy absorbing members from an outer side in the vehicle width direction.

According to the above-mentioned structure, the energy absorbing members mounted on the lower surface side of the vehicle bottom part are a plurality of energy absorbing members arranged adjacent and in parallel to each other in the vehicle width direction. Since the energy absorbing members are separated from each other, it is easy to mount the energy absorbing members on the vehicle bottom part. Further, at least one of the plurality of energy absorbing members is arranged on the lower side of the rocker. Therefore, at a time of side impact, an impact load is first inputted to the energy absorbing member on the lower side of the rocker, and thereafter, the impact load is transmitted to the other energy absorbing member arranged next to the energy absorbing member on an inner side in the vehicle width direction. The recessed and projecting engagement parts are provided in the opposing parts of the energy absorbing members adjacent to each other, respectively, and the engagement parts allow the opposing parts of the energy absorbing members adjacent to each other to be engaged with each other in a case where a load is inputted to the plurality of energy absorbing members from the outer side in the vehicle width direction. Therefore, at a time of side impact, the energy absorbing members adjacent to each other are engaged with each other, and integrally receive an impact load. Thus, the impact load is transmitted to the energy absorbing member on the inner side in the vehicle width direction from the energy absorbing member on the outer side in the vehicle width direction in a stable manner. As a result, the plurality of energy absorbing members that are arranged in parallel to each other are deformed in a stable manner and absorb the impact energy.

The above-mentioned vehicle lower part structure has an excellent effect of enhancing energy absorbing performance at a time of side impact while ensuring mountability on the vehicle bottom part.

In the vehicle lower part structure according to the invention, the outer energy absorbing member, which is one of the plurality of energy absorbing members and arranged on the most outer side in the vehicle width direction, may be mounted on a lower surface side of the rocker, and a protruding part may be formed in a side end part of the outer energy absorbing member on the inner side in the vehicle width direction on an upper side of the engagement part, the protruding part protruding towards a side end part of the other adjacent energy absorbing member on the outer side in the vehicle width direction.

According to the above-mentioned structure, the outer energy absorbing member is mounted on the lower surface side of the rocker, and the protruding part is formed in the side end part of the outer energy absorbing member on the inner side in the vehicle width direction on the upper side of the engagement part. The protruding part protrudes towards the side end part of the other adjacent energy absorbing member on the outer side in the vehicle width direction. Therefore, in a case where, for example, the side end part of the outer energy absorbing member on the inner side in the vehicle width direction is inclined to the inner side in the vehicle width direction because the rocker is displaced so as to turn to the inner side in the vehicle width direction and the vehicle lower side at a time of side impact, the protruding part of the outer energy absorbing member hits the side end part of the other adjacent energy absorbing member on the outer side in the vehicle width direction, thereby transmitting an impact load. At that time, when the protruding part of the outer energy absorbing member bites into the side end part of the other adjacent energy absorbing member on the outer side in the vehicle width direction, displacement of the outer energy absorbing member with respect to the other energy absorbing member in an upper-lower direction is restrained.

According to the above-mentioned vehicle lower part structure, even if the side end part of the outer energy absorbing member on the inner side in the vehicle width direction is inclined to the inner side in the vehicle width direction at a time of side impact, and the engagement parts are not engaged with each other sufficiently, there is an excellent effect that the energy absorbing members are deformed effectively by transmitting an impact load also from the protruding part side, thereby absorbing impact energy.

In the vehicle lower part structure according to the invention, in the outer energy absorbing member, which is one of the plurality of energy absorbing members and arranged on the most outer side in the vehicle width direction, a side surface of the outer energy absorbing member on the outer side in the vehicle width direction may be set to be on a vehicle lower side and on the outer side in the vehicle width direction or a side surface According to the above-mentioned structure, the side surface of the outer energy absorbing member on the outer side in the vehicle width direction is set to be on the vehicle lower side and the outer side in the vehicle width direction compared to a side surface of the rocker on the outer side in the vehicle width direction. Therefore, at a time of side impact, an impact load is inputted to the outer energy absorbing member before the rocker. Hence, an impact load is transmitted to the other energy absorbing member from the outer energy absorbing member in a stable route.

The above-mentioned vehicle lower part structure has an excellent effect that impact energy is absorbed in a stable manner by deforming the plurality of energy absorbing members while transmitting the impact load in a stable route at a time of side impact.

In the vehicle lower part structure according to the invention, the energy absorbing member is a grid-like member in which a plurality of holes are formed, which pass through in a vehicle front-rear direction and lined up in the vehicle width direction, and, in the outer energy absorbing member, which is one of the plurality of energy absorbing members and arranged on the most outer side in the vehicle width direction, a grid width of a region in the outer energy absorbing member on the most outer side in the vehicle width direction is set to be smaller than a grid width of other region in the outer energy absorbing member.

According to the above-mentioned structure, the grid width of the region in the outer energy absorbing member on the most outer side in the vehicle width direction is smaller than the grid width of the other region of the outer energy absorbing member. Therefore, at a time of side impact, local deformation of the region on the most outer side in the vehicle width direction is restrained. Thus, the plurality of energy absorbing members are effectively crushed as an impact load is effectively transmitted to the inner side in the vehicle width direction.

The above-mentioned vehicle lower part structure has an excellent effect that impact energy is effectively absorbed by crushing the plurality of energy absorbing members effectively at a time of side impact.

In the vehicle lower part structure according to the invention, a first energy absorbing member, which is one of the energy absorbing members adjacent to each other and arranged on the outer side in the vehicle width direction, may include an projecting engagement part as the engagement part in a side end part on the inner side in the vehicle width direction, the projecting engagement part projecting to the inner side in the vehicle width direction, and a second energy absorbing member, which is one of the energy absorbing members adjacent to each other and arranged on the inner side in the vehicle width direction, may include a recessed engagement part as the engagement part in a side end part on the outer side in the vehicle width direction, the recessed engagement part being recessed to the inner side in the vehicle width direction and able to be engaged with the projecting engagement part.

An inner end upper engagement part, which projects into a V shape to the inner side in the vehicle width direction, may be provided in an upper part of the projecting engagement part, and an inner end lower engagement part, which is recessed into a V shape to the outer side in the vehicle width direction, may be provided in a lower part of the projecting engagement part, an outer end upper engagement part, which is recessed into a V shape to the inner side in the vehicle width direction, may be provided in an upper part of the recessed engagement part, and an outer end lower engagement part, which projects into a V shape to the outer side in the vehicle width direction, may be provided in a lower part of the recessed engagement part, and the outer end upper engagement part may be able to be engaged with the inner end upper engagement part, and the outer end lower engagement part may be able to be engaged with the inner end lower engagement part.

According to the above-mentioned structure, the recessed engagement part of the second energy absorbing member arranged on the inner side in the vehicle width direction is able to be engaged with the projecting engagement part of the first energy absorbing member arranged on the outer side in the vehicle width direction. Therefore, for example, in a case where the first energy absorbing member is detached from the vehicle bottom part, even if the first energy absorbing member tries to turn so as to be inclined to the outer side in the vehicle width direction, turning of the first energy absorbing member is restricted as the upper upward surface of the projecting engagement part abuts on the upper downward surface of the recessed engagement part. Thus, even if the first energy absorbing member is detached from the vehicle bottom part, an impact load is transmitted to the second energy absorbing member from the first energy absorbing member.

The above-mentioned vehicle lower part structure has an excellent effect that, even if the first energy absorbing member is detached from the vehicle bottom part at a time of side impact, it is possible to transmit an impact load from the first energy absorbing member to the second energy absorbing member, thereby maintaining absorption of impact energy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2A is a plan view schematically showing a part of the vehicle lower part structure according to the first embodiment of the invention, and FIG. 2B is a sectional view taken along the line 2B-2B in FIG. 2A that schematically shows a part of the vehicle lower part structure according to the first embodiment of the invention;

DETAILED DESCRIPTION OF EMBODIMENTS

Figure 1:
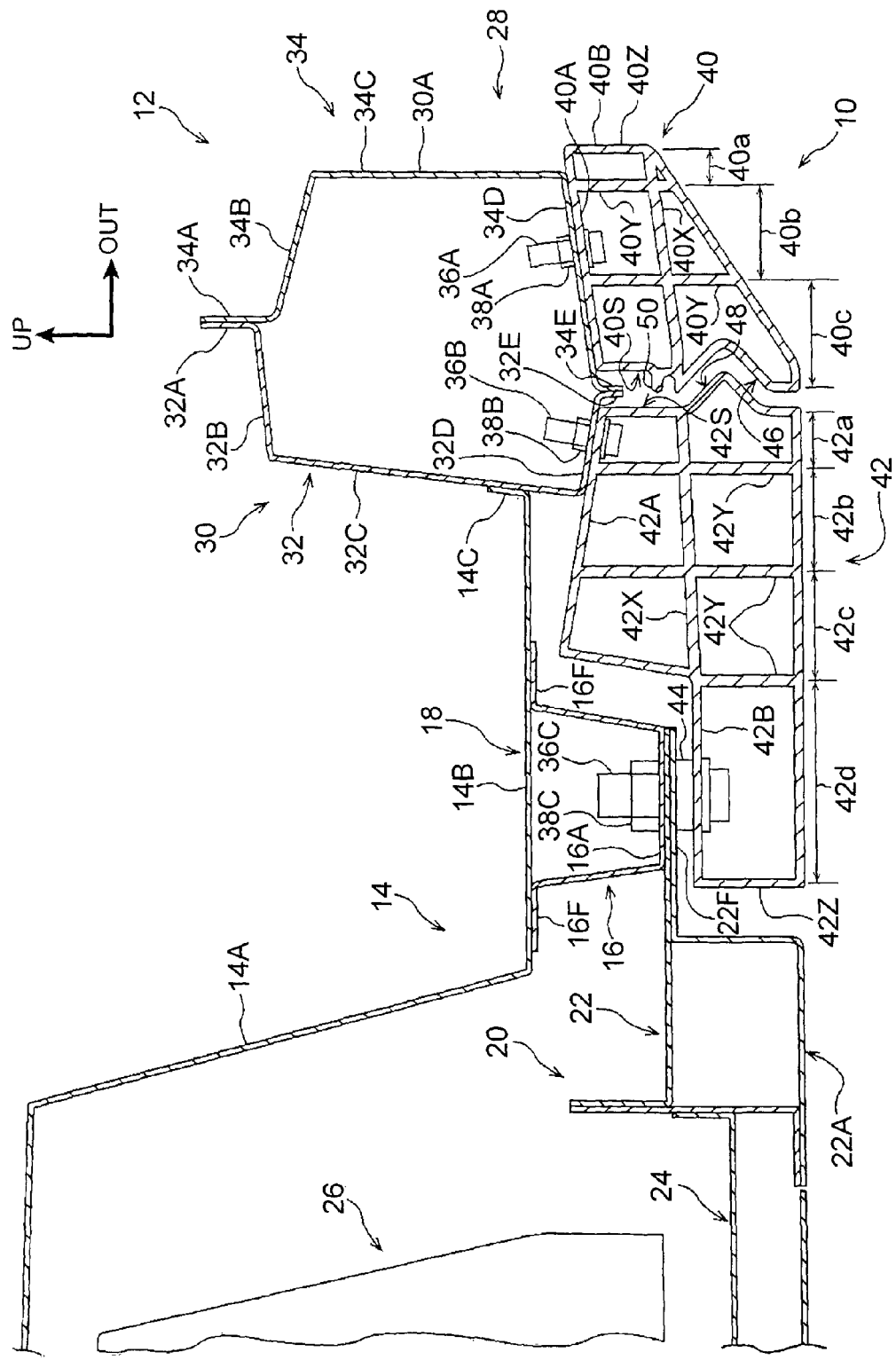
FIG. 1 is a vertical sectional view showing a vehicle lower part structure according to a first embodiment of the invention in a vehicle front view.
Figure 3:
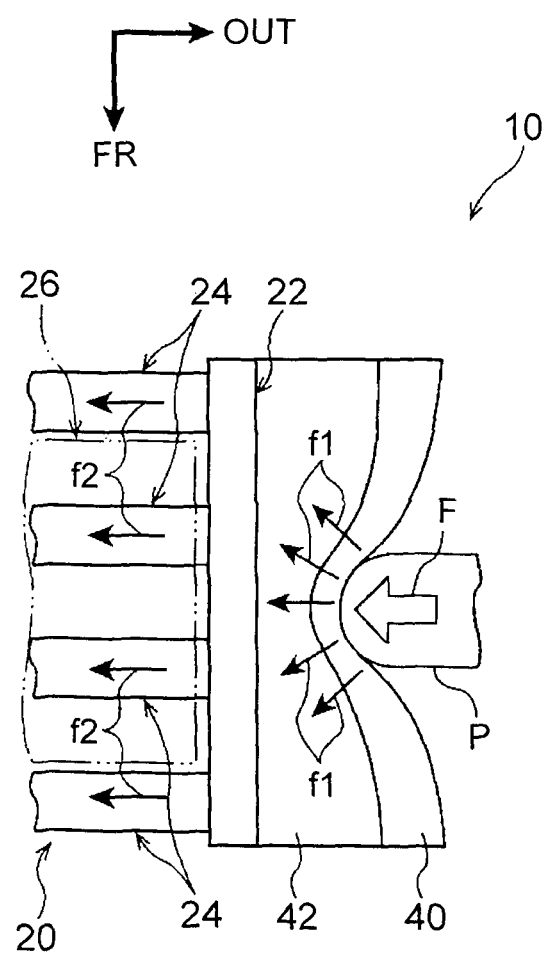
FIG. 3 is a plan view schematically showing a state at a time of side impact according to the first embodiment of the invention.

[First Embodiment] A vehicle lower part structure according to a first embodiment of the invention is explained by using FIG. 1 to FIG. 3. An arrow FR shown as appropriate in these drawings indicates a vehicle front side, an arrow UP indicates a vehicle upper side, and an arrow OUT indicates an outer side in a vehicle width direction.

In FIG. 1, a vertical sectional view of a vehicle lower part structure 10 according to a first embodiment of the invention is shown in a vehicle front view. The vehicle lower part structure 10 shown in FIG. 1 is structured by including a lower part of a vehicle side part 12. As shown in FIG. 1, a floor panel 14 is arranged in a vehicle lower part. A unit mounting part 14A, which projects to a vehicle upper side, is formed in an intermediate part of the floor panel 14 in a vehicle width direction. The unit mounting part 14A extends in a vehicle front-rear direction. In the floor panel 14, a flat plate part 14B is formed, which is generally horizontal and continues from the unit mounting part 14A to an outer side in the vehicle width direction.

An under reinforcement 16 is installed on a lower surface side of the flat plate part 14B of the floor panel 14. The under reinforcement 16 is a long vehicle body framing member extending in the vehicle front-rear direction. The under reinforcement 16 has a hat-shaped vertical section in the vehicle front view, and is arranged so that an opening side faces the vehicle upper side. In the under reinforcement 16, left and right flange parts 16F are joined to the floor panel 14 by spot welding. Thus, the under reinforcement 16 and the floor panel 14 form a closed section structural part 18 extending in the vehicle front-rear direction.

A flange part 22F of a side member (a vertical member) 22 that structures a frame 20 is fastened by a bolt to a bottom wall part 16A of the under reinforcement 16. The flange part 22F of the side member 22 structures an end part of the side member 22 on the outer side in the vehicle width direction. FIG. 2A shows a part of the vehicle lower part structure 10 in a schematic plan view. As shown in FIG. 2A, the side member 22 extends in the vehicle front-rear direction. As shown in FIG. 1, in this embodiment, the side member 22 is formed by joining three panels, and includes a rectangular cylindrical closed section structural part 22A extending in the vehicle front-rear direction. This closed section structural part 22A is set on an inner side in the vehicle width direction and on a vehicle lower side of the under reinforcement 16.

The frame 20 includes a plurality of cross members (horizontal members) 24 that are bridged between the side members 22 provided on the left and right of the vehicle lower part. As shown in FIG. 2A, each of the cross members 24 extends in the vehicle width direction, and the plurality of cross members 24 are arranged in parallel to each other in the vehicle front-rear direction. FIG. 2B shows a sectional view taken along the line 2B-2B in FIG. 2A. As shown in FIG. 1, FIG. 2A, and FIG. 2B, a stack 26 is mounted on an upper side of the cross members 24.

Meanwhile, as shown in FIG. 1, an end part 14C of the floor panel 14 on the outer side in the vehicle width direction is bent and extended in to the vehicle upper side, and is joined to a side surface of a rocker 30 (also referred to as a "side sill") on an inner side in the vehicle width direction by spot welding. In this embodiment, a vehicle bottom part 28 is structured by including the floor panel 14, the under reinforcement 16, and a lower part of the rocker 30. The rocker 30 is a long vehicle body framing member provided in a lower end part of the vehicle side part 12, and extends in the vehicle front-rear direction. The rocker 30 includes a rocker inner panel 32, which is a component on the inner side in the vehicle width direction, and a rocker outer panel 34, which is a component on the outer side in the vehicle width direction.

The rocker inner panel 32 has a hat-shaped vertical section in the vehicle front view, and is arranged so that an open side faces the outer side in the vehicle width direction. The rocker inner panel 32 includes an upper wall part 32B that forms an upper surface, a side wall part 32C that forms a side surface, and a lower wall part 32D that forms a lower surface. The rocker inner panel 32 also includes an upper flange part 32A, which is bent from an end part of the upper wall part 32B on the outer side in the vehicle width direction and extends to the vehicle upper side, and the lower flange part 32E, which is bent from an end part of the lower wall part 32D on the outer side in the vehicle width direction and extends to the vehicle lower side.

On the other hand, the rocker outer panel 34 has a hat-shaped vertical section in the vehicle front view, and is arranged so that an open side faces the inner side in the vehicle width direction. The rocker outer panel 34 includes an upper wall part 34B that forms an upper surface, a side wall part 34C that forms a side surface, and a lower wall part 34D that forms a lower surface. The rocker outer panel 34 also includes an upper flange part 34A, which is bent from an end part of the upper wall part 34B on the inner side in the vehicle width direction and extends to the vehicle upper side, and a lower flange part 34E, which is bent from an end part of the lower wall part 34D on the inner side in the vehicle width direction and extends to the vehicle lower side.

The upper flange part 32A of the rocker inner panel 32 and the upper flange part 34A of the rocker outer panel 34 are joined to each other by spot welding. Similarly, the lower flange part 32E of the rocker inner panel 32 and the lower flange part 34E of the rocker outer panel 34 are joined to each other by spot welding. Thus, the rocker inner panel 32 and the rocker outer panel 34 are integrated with each other, and form the rocker 30 that includes a closed section structural part extending in the vehicle front-rear direction.

An outer energy absorbing member 40 and an inner energy absorbing member 42, which serve as a plurality of energy absorbing members, are mounted on a lower surface side of the vehicle bottom part 28 that includes a lower part of the rocker 30. The outer energy absorbing member 40 and the inner energy absorbing member 42 are arranged adjacent and in parallel to each other in the vehicle width direction. Each of the outer energy absorbing member 40 and the inner energy absorbing member 42 is formed integrally by extrusion molding of an aluminum material, and inner sides of outer peripheral wall parts 40Z, 42Z are partitioned by a plurality of vertical ribs 40Y, 42Y and a single horizontal rib 40X, 42X, respectively. Thus, the outer energy absorbing member 40 and the inner energy absorbing member 42 are grid-like members in which a plurality of holes are formed, which pass through in the vehicle front-rear direction and are arranged in parallel to each other in the vehicle width direction.

The outer energy absorbing member 40 is an energy absorbing member arranged on the outer side in the vehicle width direction with respect to the inner energy absorbing member 42 (in other words, one of the plurality of energy absorbing members, which is arranged on the most outer side in the vehicle width direction). The outer energy absorbing member 40 is arranged on a lower side of the rocker outer panel 34 of the rocker 30, and mounted on a lower surface side of the lower wall part 34D of the rocker outer panel 34 by fastening a bolt. To be specific, a bolt 36A passes through the upper wall part 40A of the outer energy absorbing member 40 and the lower wall part 34D of the rocker outer panel 34 from the lower side, and the bolt 36A is screwed with a nut 38A arranged on an upper surface of the lower wall part 34D of the rocker outer panel 34. Thus, the upper wall part 40A of the outer energy absorbing member 40 is fixed to the lower wall part 34D of the rocker outer panel 34.

A side surface 40B of the outer energy absorbing member 40 on the outer side in the vehicle width direction is arranged so that a surface including the vehicle upper-lower direction and the vehicle front-rear direction is a surface direction of the side surface 40B. The side surface 40B is set on the vehicle lower side and the outer side in the vehicle width direction of the side surface 30A of the rocker 30 on the outer side in the vehicle width direction. Further, a grid width 40a of a region in the outer energy absorbing member 40 on the most outer side in the vehicle width direction is set to be smaller than grid widths 40b, 40c of other regions of the outer energy absorbing member 40.

The inner energy absorbing member 42 arranged on the inner side in the vehicle width direction with respect to the outer energy absorbing member 40 is arranged on a lower side of the rocker inner panel 32 of the rocker 30, the flat plate part 14B of the floor panel 14, and the under reinforcement 16. The inner energy absorbing member 42 is formed like a step, in which a second upper wall part 42B on the inner side in the vehicle width direction is one step lower than a first upper wall part 42A on the outer side in the vehicle width direction. The second upper wall part 42B on the inner side in the vehicle width direction is set as an extended part of the horizontal rib 42X on the inner side in the vehicle width direction.

The first upper wall part 42A of the inner energy absorbing member 42 on the outer side in the vehicle width direction is mounted on a lower surface side of the lower wall part 32D of the rocker inner panel 32 by fastening a bolt. In short, a bolt 36B passes through the first upper wall part 42A of the inner energy absorbing member 42 on the outer side in the vehicle width direction and the lower wall part 32D of the rocker inner panel 32 from the lower side, and the bolt 36B is screwed with a nut 38B arranged on an upper surface of the lower wall part 32D of the rocker inner panel 32. Thus, the first upper wall part 42A of the inner energy absorbing member 42 on the outer side in the vehicle width direction is fixed to the lower wall part 32D of the rocker inner panel 32.

Further, the second upper wall part 42B of the inner energy absorbing member 42 on the inner side in the vehicle width direction is mounted on a lower surface side of the bottom wall part 16A of the under reinforcement 16 by fastening a bolt. In short, a bolt 36C passes through the second upper wall part 42B of the inner energy absorbing member 42 on the inner side in the vehicle width direction, a cylindrical collar 44, the flange part 22F of the side member 22, and the bottom wall part 16A of the under reinforcement 16 from the lower side, and the bolt 36C is screwed with a nut 38C arranged on an upper surface of the bottom wall part 16A of the under reinforcement 16. Thus, the second upper wall part 42B of the inner energy absorbing member 42 on the inner side in the vehicle width direction is fixed to the bottom wall part 16A of the under reinforcement 16.

A grid width 42a of a region of the inner energy absorbing member 42 on the most outer side in the vehicle width direction is set to be smaller than grid widths 42b, 42c, 42d of other regions in the inner energy absorbing member 42.

A side end part 40S of the outer energy absorbing member 40 on the inner side in the vehicle width direction and a side end part 42S of the inner energy absorbing member 42 on the outer side in the vehicle width direction are opposing parts that are adjacent to each other and face each other. The outer energy absorbing member 40 includes a recessed engagement part 46 as an engagement part in the side end part 40S on the inner side in the vehicle width direction. The recessed engagement part 46 is recessed into a V shape to the outer side in the vehicle width direction. On the contrary, the inner energy absorbing member 42 includes a projecting engagement part 48 as an engagement part in the side end part 42S on the outer side in the vehicle width direction. The projecting engagement part 48 projects into a V shape to the outer side in the vehicle width direction, and is able to be engaged with the recessed engagement part 46. In short, when a load is inputted to the outer energy absorbing member 40 and the inner energy absorbing member 42 from the outer side in the vehicle width direction, the recessed engagement part 46 and the projecting engagement part 48 allows the side end part 40S of the outer energy absorbing member 40 on the inner side in the vehicle width direction and the side end part 42S of the inner energy absorbing member 42 on the outer side of the vehicle width direction to be engaged with each other.

A rib 50 is formed in the side end part 40S of the outer energy absorbing member 40 on the inner side in the vehicle width direction on an upper side of the recessed engagement part 46. The rib 50 serves as a protruding part protruding towards the side end part 42S of the inner energy absorbing member 42 on the outer side in the vehicle width direction. In short, the rib 50 is set to press the side end part 42S of the inner energy absorbing member 42 on the outer side in the vehicle width direction, in a case where the side end part 40S of the outer energy absorbing member 40 on the inner side in the vehicle width direction is inclined to the inner side in the vehicle width direction.

In this embodiment, a plate thickness of the rib 50 is set to be equal to a plate thickness of the other region of the outer energy absorbing member 40. Therefore, imbalance of forming does not happen. In a root part of the rib 50, a recessed part that is recessed to the outer side in the vehicle width direction is not formed. Therefore, a projecting part corresponding to such a recessed part is not necessary in a forming mold, thereby ensuring strength of the mold easily. A groove part between the rib 50 and the recessed engagement part 46 extends in the vehicle front-rear direction. Therefore, it is possible to form the shape of the outer energy absorbing member 40 by extrusion molding of an aluminum material. As stated so far, moldability of the outer energy absorbing member 40 is not deteriorated even if the rib 50 is set.

(Actions and effects) Next, actions and effects of the foregoing embodiment are explained.

With the structure of this embodiment, the outer energy absorbing member 40 and the inner energy absorbing member 42 are arranged adjacent and parallel to each other in the vehicle width direction and mounted on the lower surface side of the vehicle bottom part 28. Since the energy absorbing members are separated from each other, the energy absorbing members are easily mounted on the vehicle bottom part 28 even if there is slight variation in position accuracy of the vehicle bottom part 28.

In a vehicle body, it is possible that an outer-side panel such as the rocker outer panel 34 may be slightly misaligned with an inner-side panel such as the rocker inner panel 32 in the vehicle upper-lower direction when assembled. For example, in a comparative structure in which an energy absorbing member that resembles an integration of the outer energy absorbing member 40 and the inner energy absorbing member 42 is mounted on the vehicle bottom part 28, it is difficult to align positions of fixing regions. Moreover, if the positions of the rocker outer panel 34 and the rocker inner panel 32 are misaligned with respect to each other in an upper-lower direction, it is possible that a side surface of the energy absorbing member on the outer side in the vehicle width direction may be obliquely inclined with respect to the vehicle upper-lower direction. When the side surface of the energy absorbing member on the outer side in the vehicle width direction is inclined, it is difficult to control a load transmission mode at a time of side impact. On the contrary, in this embodiment, the outer energy absorbing member 40 is mounted on the rocker outer panel 34, and the inner energy absorbing member 42 is mounted on the rocker inner panel 32. Therefore, mounting is easily done, and inclination of the side surface 40B of the outer energy absorbing member 40 on the outer side in the vehicle width direction is less likely. Thus, it is easy to control a load transmission mode at a time of side impact.

In this embodiment, the outer energy absorbing member 40 is arranged on the lower side of the rocker 30. Hence, at a time of side impact, an impact load is inputted from a side of a collision partner (for example, a columnar pole) to the outer energy absorbing member 40 on the lower side of the rocker 30. Thereafter, the impact load is transmitted to the inner energy absorbing member 42 arranged adjacent to the outer energy absorbing member 40 on the inner side in the vehicle width direction.

Here, the recessed engagement part 46 is provided in the side end part 40S of the outer energy absorbing member 40 on the inner side in the vehicle width direction, and the projecting engagement part 48 is provided in the side end part 42S of the inner energy absorbing member 42 on the outer side of the vehicle width direction. Then, in a case where a load is inputted from the outer side in the vehicle width direction to the outer energy absorbing member 40 and the inner energy absorbing member 42, the recessed engagement part 46 and the projecting engagement part 48 allow the side end part 40S of the outer energy absorbing member 40 on the inner side in the vehicle width direction and the side end part 42S of the inner energy absorbing member 42 on the outer side in the vehicle width direction to be engaged with each other. In other words, the recessed engagement part 46 seizes the projecting engagement part 48, and displacement (escape) of the outer energy absorbing member 40 with respect to the inner energy absorbing member 42 in the upper-lower direction is restrained.

Therefore, at a time of side impact, the outer energy absorbing member 40 and the inner energy absorbing member 42, which are adjacent to each other, are engaged with each other, and integrally receive an impact load. Therefore, the impact load is transmitted to the inner energy absorbing member 42 from the outer energy absorbing member 40 in a stable manner. As a result, the outer energy absorbing member 40 and the inner energy absorbing member 42, which are arranged parallel to each other, deform stably and absorb the impact energy.

In this embodiment, the side surface 40B of the outer energy absorbing member 40 on the outer side in the vehicle width direction is set on the vehicle lower side and the outer side in the vehicle width direction of the side surface 30A of the rocker 30 on the outer side in the vehicle width direction. Therefore, at a time of side impact, an impact load is inputted to the outer energy absorbing member 40 before the rocker 30, and thereafter, the impact load is transmitted to the inner energy absorbing member 42 from the outer energy absorbing member 40 in a stable route. Therefore, it is even easier to control the load transmission mode at the time of side impact. As a result, it is possible to deform the outer energy absorbing member 40 and the inner energy absorbing member 42 in a stable manner, and absorb impact energy in a stable manner.

In this embodiment, the outer energy absorbing member 40 is mounted on the lower surface side of the rocker 30, and the rib 50 is formed in the side end part 40S of the outer energy absorbing member 40 on the inner side in the vehicle width direction on the upper side of the recessed engagement part 46. The rib 50 projects towards the side end part 42S of the inner energy absorbing member 42 on the outer side in the vehicle width direction. Therefore, for example, in a case where the side end part 40S of the outer energy absorbing member 40 on the inner side in the vehicle width direction is inclined to the inner side in the vehicle width direction because the rocker 30 is displaced so as to rotate towards the inner side in the vehicle width direction and to the vehicle lower side, or the rocker 30 is crushed in the vehicle width direction and an inclination angle of the lower wall part 34D of the rocker outer panel 34 is increased at a time of side impact, the rib 50 of the outer energy absorbing member 40 hits the side end part 42S on the outer side in the vehicle width direction, thereby transmitting impact load. Further, at that time, once the rib 50 of the outer energy absorbing member 40 bites into the side end part 42S of the inner energy absorbing member 42 on the outer side in the vehicle width direction, misalignment of the outer energy absorbing member 40 with respect to the inner energy absorbing member 42 in the upper-lower direction is restrained. Therefore, even if the recessed engagement part 46 and the projecting engagement part 48 are not engaged with each other sufficiently, it is possible to deform the inner energy absorbing member 42 effectively, thereby absorbing impact energy.

Moreover, in this embodiment, the grid width 40a of the region in the outer energy absorbing member 40 on the most outer side in the vehicle width direction is smaller than the grid widths 40b, 40c of the other regions in the outer energy absorbing member 40. Therefore, at a time of side impact, local deformation (buckling) in the region on the most outer side in the vehicle width direction is restrained. Supplementary explanation is that, for example, in a comparative structure in which a grid width of a quadrangular cylindrical part in a grid-like outer energy absorbing member on the most outer side in the vehicle width direction is larger than a grid width of the other region in the outer energy absorbing member, an upper and lower side part of the quadrangular cylindrical part on the most outer side in the vehicle width direction is easily bent like a pantograph at a time of side impact. On the contrary, in the structure according to this embodiment, since rigidity and strength of the region in the outer energy absorbing member 40 on the most outer side in the vehicle width direction is enhanced. Therefore, bending (buckling) like the comparative structure is less likely to happen at a time of side impact.

Therefore, as shown in FIG. 3, an impact load F from a collision partner P is effectively transmitted while being dispersed to the inner side in the vehicle width direction (see arrows f1). Then, the outer energy absorbing member 40 and the inner energy absorbing member 42 are crushed effectively, and impact energy is absorbed effectively. As a result, deformation of the side member 22 of the frame 20 is prevented or effectively restrained, and a load is prevented or effectively restrained from being inputted to the stack 26. Further, the load transmitted to the side member 22 is dispersed and transmitted to the plurality of cross members 24 (see arrows f2).

As explained so far, according to the vehicle lower part structure 10 of this embodiment, it is possible to enhance energy absorbing performance at a time of side impact while ensuring mountability on the vehicle bottom part 28 shown in FIG. 1.

Figure 4:
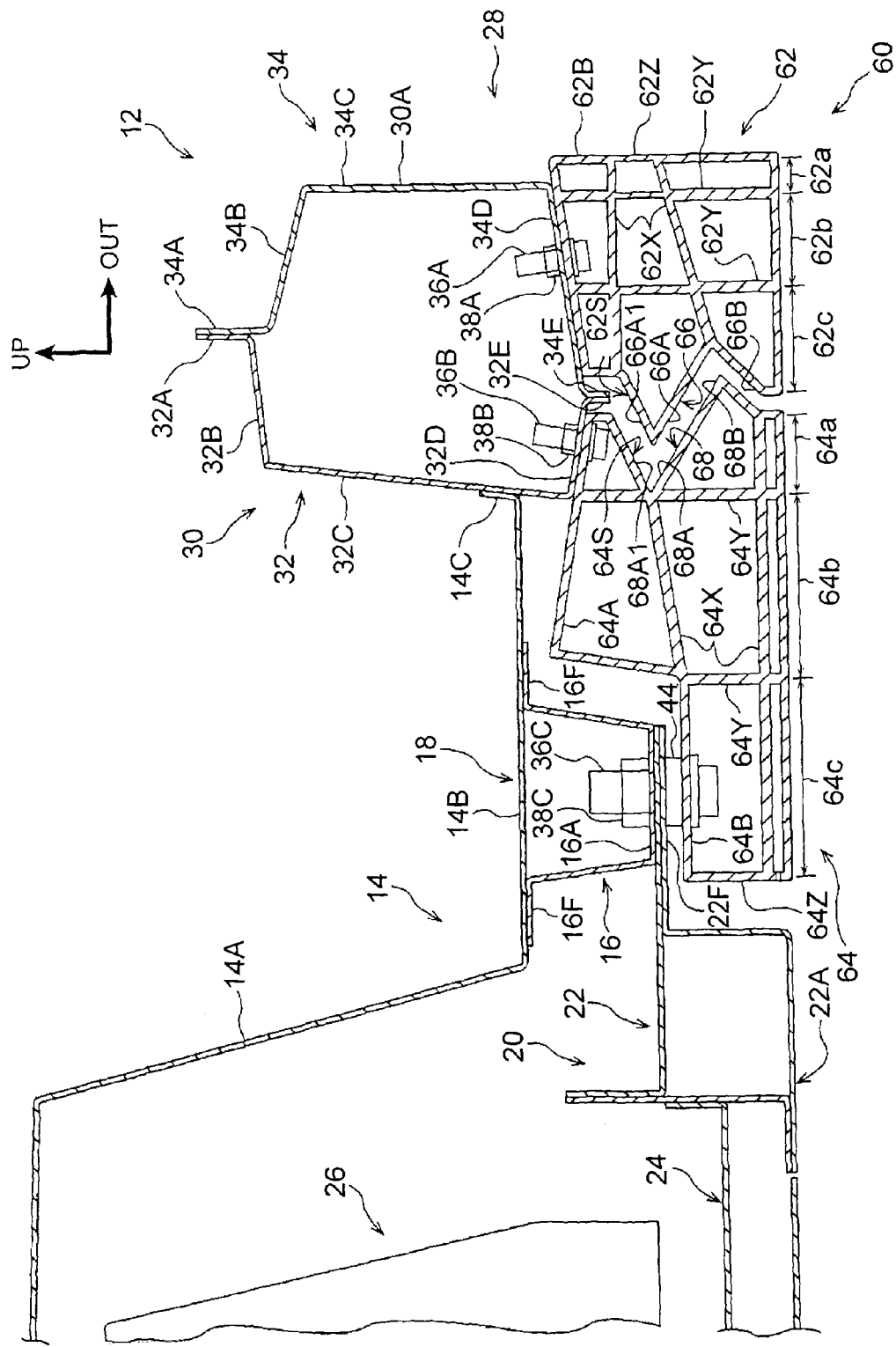
FIG. 4 is a vertical sectional view showing a vehicle lower part structure according to a second embodiment of the invention in a vehicle front view.

[Second embodiment] Next, a vehicle lower part structure 60 according to a second embodiment of the invention is explained by using FIG. 4. The same reference numerals are used for components that are substantially similar to those of the first embodiment, and explanation is omitted.

In FIG. 4, a vertical sectional view of the vehicle lower part structure 60 according to this embodiment is shown in a vehicle front view. As shown in FIG. 4, an outer energy absorbing member 62 and an inner energy absorbing member 64, serving as a plurality of energy absorbing members, are mounted on a lower surface side of a vehicle bottom part 28. The outer energy absorbing member 62 serving as a first energy absorbing member and an inner energy absorbing member 64 serving as a second energy absorbing member are arranged adjacent and in parallel to each other in a vehicle width direction. Each of the outer energy absorbing member 62 and the inner energy absorbing member 64, which are adjacent to each other, is formed integrally by extrusion molding of an aluminum material, and inner sides of outer peripheral wall parts 62Z, 64Z are partitioned by a plurality of vertical ribs 62Y, 64Y and a plurality of horizontal ribs 62X, 64X, respectively. Thus, the outer energy absorbing member 62 and the inner energy absorbing member 64 are grid-like members in which a plurality of holes are formed, which pass through in a vehicle front-rear direction and are lined up in the vehicle width direction.

The outer energy absorbing member 62 is an energy absorbing member which is arranged on an outer side in the vehicle width direction with respect to the inner energy absorbing member 64 (in other words, one of the plurality of energy absorbing members, which is arranged on the most outer side in the vehicle width direction). This outer energy absorbing member 62 is arranged on a lower side of a rocker outer panel 34 of a rocker 30, and mounted on a lower surface side of a lower wall part 34D of the rocker outer panel 34 by fastening a bolt.

A side surface 62B of the outer energy absorbing member 62 on the outer side in the vehicle width direction is arranged so that a surface including a vehicle upper-lower direction and the vehicle front-rear direction is a surface direction of the side surface 62B. The side surface 62B is set on the vehicle lower side and the outer side in the vehicle width direction of the side surface 30A of the rocker 30 on the outer side in the vehicle width direction. Further, a grid width 62a of a region in the outer energy absorbing member 62 on the most outer side in the vehicle width direction is set to be smaller than grid widths 62b, 62c of other regions in the outer energy absorbing member 62.

The inner energy absorbing member 64 arranged on the inner side in the vehicle width direction with respect to the outer energy absorbing member 62 is arranged on a lower side of a rocker inner panel 32 of the rocker 30, a flat plate part 14B of a floor panel 14, and an under reinforcement 16. The inner energy absorbing member 64 is formed like a step, in which a second upper wall part 64B on the inner side in the vehicle width direction is one step lower than a first upper wall part 64A on the outer side in the vehicle width direction. The second upper wall part 64B on the inner side in the vehicle width direction is generally set as an extended part of the horizontal rib 64X on the inner side in the vehicle width direction.

The first upper wall part 64A of the inner energy absorbing member 64 on the outer side in the vehicle width direction is mounted on a lower surface side of the lower wall part 32D of the rocker inner panel 32 by fastening a bolt. The second upper wall part 64B of the inner energy absorbing member 64 on the inner side in the vehicle width direction is attached to a lower surface side of a bottom wall part 16A of the under reinforcement 16 by fastening a bolt. A grid width 64a of a region in the inner energy absorbing member 64 on the most outer side in the vehicle width direction is set to be smaller than grid widths 64b, 64c of the other regions in the inner energy absorbing member 64.

A side end part 62S of the outer energy absorbing member 62 on the inner side in the vehicle width direction and a side end part 64S of the inner energy absorbing member 64 on the outer side in the vehicle width direction are opposing parts that are adjacent to each other and face each other. The outer energy absorbing member 62 includes an inner end engagement part 66 as an recessed and projecting engagement part in the side end part 62S on the inner side in the vehicle width direction. An upper part of the inner end engagement part 66 is an inner end upper engagement part 66A serving as a projecting engagement part that projects into a V shape to the inner side in the vehicle width direction. A lower part of the inner end engagement part 66 is an inner end lower engagement part 66B that is recessed into a V shape to the outer side in the vehicle width direction.

On the contrary, the inner energy absorbing member 64 includes an outer end engagement part 68 as a recessed and projecting engagement part in the side end part 64S on the outer side in the vehicle width direction. An upper part of the outer end engagement part 68 is an outer end upper engagement part 68A serving as a recessed engagement part that is recessed into a V shape to the inner side in the vehicle width direction. The outer end upper engagement part 68A is able to be engaged with the inner end upper engagement part 66A. A lower part of the outer end engagement part 68 is an outer end lower engagement part 68B that projects into a V shape to the outer side in the vehicle width direction. The outer end lower engagement part 68B is able to be engaged with the inner end lower engagement part 66B. As stated above, the inner end engagement part 66 of the outer energy absorbing member 62 and the outer end engagement part 68 of the inner energy absorbing member 64 are able to be engaged with each other. In short, the inner end engagement part 66 and the outer end engagement part 68 allow the side end part 62S of the outer energy absorbing member 62 on the inner side in the vehicle width direction and the side end part 64S of the inner energy absorbing member 64 on the outer side in the vehicle width direction to be engaged with each other in a case where a load is inputted to the outer energy absorbing member 62 and the inner energy absorbing member 64 from the outer side in the vehicle width direction.

In the embodiment explained above, actions and effects similar to those of the first embodiment stated above are obtained. Further, according to this embodiment, in a case where, for example, the outer energy absorbing member 62 is detached from the vehicle bottom part 28, even if the outer energy absorbing member 62 tries to turn so as to be inclined to the outer side in the vehicle width direction, the outer energy absorbing member 62 is prevented from turning because an upper upward surface 66A1 of the inner end upper engagement part 66A abuts on an upper downward surface 68A1 of the outer end upper engagement part 68A.

Hence, if the outer energy absorbing member 62 is detached from the vehicle bottom part 28, an impact load is transmitted to the inner energy absorbing member 64 from the outer energy absorbing member 62. Thus, it is possible to maintain absorption of impact energy.

[Supplementary explanation of the embodiments] As a modified example of the foregoing first and second embodiments, the number of the energy absorbing members mounted on the lower side surface of the vehicle bottom part may be three or more, and arranged adjacent to each other in the vehicle width direction.

Also, as a modified example of the foregoing first and second embodiments, the energy absorbing members may be non grid-shaped energy absorbing members, such as an energy absorbing member including a cylindrical part, an axis direction of which is the vehicle width direction, and closed parts that close openings on both ends of the cylindrical part in the vehicle width direction. The energy absorbing member may also be formed by a material other than an aluminum material, such as a metallic material and a resin material.

Further, in the case where the energy absorbing member is a grid-like member, the number of the vertical ribs (40Y, 42Y, 62Y, 64Y) only needs to be one or more, and is not limited to the example of the foregoing embodiment. Also, in the case where the energy absorbing member is a grid-like member, although sectional sizes are smaller and strength is enhanced when there are the horizontal ribs (40X, 42X, 62X, 64X), a structure without horizontal ribs may be employed.

As shown in FIG. 1 and FIG. 4, in the foregoing first and second embodiments, the grid widths 40a, 62a of the regions in the outer energy absorbing members 40, 62 on the most outer side in the vehicle width direction are set to be smaller than the grid widths 40b, 40c, 62b, 62c of the other regions in the outer energy absorbing members 40, 62. However, it is possible not to employ such a structure. Similarly, in the foregoing embodiments, the grid widths 42a, 64a of the regions of the inner energy absorbing members 42, 64 on the most outer side in the vehicle width direction are set to be smaller than the grid widths 42b, 42c, 42d, 64b, 64c of the other regions in the inner energy absorbing members 42, 64. However, it is possible not to employ such a structure.

As a modified example of the first and second embodiments, such a structure may be employed that, in an outer energy absorbing member, which is one of a plurality of energy absorbing members and arranged on the most outer side in the vehicle width direction, a side surface of the outer energy absorbing member on the outer side in the vehicle width direction is set on a vehicle lower side of a side surface of a rocker on the outer side in the vehicle width direction, and at a position in the vehicle width direction equal the position of the side surface of the rocker on the outer side in the vehicle width direction.

The engagement parts respectively provided on the opposing parts of the energy absorbing members, which are adjacent to each other, are not limited to the examples in the foregoing embodiment, and only need to have shapes that are able to be engaged with each other, such as a rectangular projecting-shaped engagement part and a rectangular recessed-shaped engagement part that are engaged with each other, or a semicircular projecting-shaped engagement part and a semicircular recessed-shaped engagement part that are engaged with each other.

Further, as a modified example of the foregoing second embodiment, the engagement part of the first energy absorbing member (the outer energy absorbing member 62) may be structured only by a region corresponding to the inner end upper engagement part 66A shown in FIG. 4, and the engagement part of the second energy absorbing member (the inner energy absorbing member 64) may be structured only by a region corresponding to the outer end upper engagement part 68A.

In the engagement part provided in the energy absorbing member, a plurality of recessed parts may be formed, or a plurality of projecting parts may be formed. A position where the engagement part is set in an upper-lower direction may be any position, such as an upper part or a lower part of the opposing part of the energy absorbing member.

As a modified example of the foregoing embodiments, the engagement part may be formed separately from the energy absorbing member, and may be fixed to the energy absorbing member.

As shown in FIG. 1, in the foregoing first embodiment, the rib 50 is formed in the side end part 40S of the outer energy absorbing member 40 on the inner side in the vehicle width direction on the upper side of the recessed engagement part 46. However, a structure without the rib 50 may also be possible. The protruding part may be other protruding part that protrudes into a V shape to the inner side in the vehicle width direction.

The foregoing embodiments and the plurality of modified examples stated above may be combined as necessary and carried out.

An example of the invention has been explained so far. However, the invention is not limited to the foregoing, and it is obvious that the invention may be carried out with various modifications without departing from the gist of the invention.

The invention claimed is:

1. A vehicle lower part structure, comprising:
   a vehicle bottom part configured to include a lower part of a rocker provided in a lower end part of a vehicle side part, the rocker comprising a rocker inner panel having a lower inner wall part, which is arranged on an inner side in the vehicle width direction, and a rocker outer panel having a lower outer wall part, which is arranged on the outer side in the vehicle width direction; and
   a plurality of energy absorbing members configured to be mounted on a lower surface side of the vehicle bottom part and arranged adjacent to each other in a vehicle width direction, with one of the adjacent energy absorbing members fixed to the lower inner wall part, and an other of the adjacent energy absorbing members fixed to the lower outer wall part,
   wherein each of the plurality of energy absorbing members includes an engagement part that is recessed or projecting the engagement parts provided in opposing parts of the energy absorbing members adjacent to each other, with the one adjacent energy absorbing member having a recessed engagement part and the other adjacent energy absorbing member having a projecting engagement part, the opposing parts of the energy absorbing members adjacent to each other to being configured to be engaged with each other in a case where a load is inputted to the plurality of energy absorbing members from an outer side in the vehicle width direction.

2. The vehicle lower part structure according to claim 1, wherein
   an outer energy absorbing member, which is one of the plurality of energy absorbing members and arranged on the most outer side in the vehicle width direction, is mounted on a lower surface side of the rocker, and a protruding part is formed in a side end part of the outer energy absorbing member on an inner side in the vehicle width direction on an upper side of the engagement part, the protruding part protruding towards a side end part of the other adjacent energy absorbing member on the outer side in the vehicle width direction.

3. The vehicle lower part structure according to claim 1, wherein, in an outer energy absorbing member, which is one of the plurality of energy absorbing members and arranged on the most outer side in the vehicle width direction, a side surface of the outer energy absorbing member on the outer side in the vehicle width direction is set to be on a vehicle lower side and on the outer side in the vehicle width direction compared to a side surface of the rocker on the outer side in the vehicle width direction.

4. The vehicle lower part structure according to claim 1, wherein the energy absorbing member is a grid member in which a plurality of holes are formed, which pass through in a vehicle front-rear direction and lined up in the vehicle width direction, and in an outer energy absorbing member, which is one of the plurality of energy absorbing members and arranged on the most outer side in the vehicle width direction, a grid width of a region in the outer energy absorbing member on the most outer side in the vehicle width direction is set to be smaller than a grid width of an other region in the outer energy absorbing member.

5. The vehicle lower part structure according to claim 1, wherein a first energy absorbing member, which is one of the energy absorbing members adjacent to each other and arranged on the outer side in the vehicle width direction, includes an projecting engagement part as the engagement part in a side end part on an inner side in the vehicle width direction, the projecting engagement part projecting to the inner side in the vehicle width direction, and a second energy absorbing member, which is one of the energy absorbing members adjacent to each other and arranged on the inner side in the vehicle width direction, includes a recessed engagement part as the engagement part in a side end part on the outer side in the vehicle width direction, the recessed engagement part being recessed to the inner side in the vehicle width direction and able to be engaged with the projecting engagement part.

6. The vehicle lower part structure according to claim 5, wherein an inner end upper engagement part, which projects into a V shape to the inner side in the vehicle width direction, is provided in an upper part of the projecting engagement part, and an inner end lower engagement part, which is recessed into a V shape to the outer side in the vehicle width direction, is provided in a lower part of the projecting engagement part, an outer end upper engagement part, which is recessed into a V shape to the inner side in the vehicle width direction, is provided in an upper part of the recessed engagement part, and an outer end lower engagement part, which projects into a V shape to the outer side in the vehicle width direction, is provided in a lower part of the recessed engagement part, and the outer end upper engagement part is able to be engaged with the inner end upper engagement part, and the outer end lower engagement part is able to be engaged with the inner end lower engagement part.

7. The vehicle lower part structure according to claim 1, wherein the plurality of energy absorbing members comprises an outer energy absorbing member and an inner energy absorbing member, the rocker inner panel is arranged on one side of a rocker flange, and the rocker outer panel is arranged on an other side of the rocker flange, the outer energy absorbing member is one of the plurality of energy absorbing members, which is arranged on the most outer side in the vehicle width direction, and is arranged on a lower side of the rocker outer panel of the rocker, the inner energy absorbing member is arranged on the inner side in the vehicle width direction with respect to the outer energy absorbing member, and is arranged on a lower side of the rocker inner panel of the rocker.

\* \* \* \* \*